United States Patent
Narayanam et al.

(10) Patent No.: US 11,829,634 B2
(45) Date of Patent: Nov. 28, 2023

(54) CONSISTENT GOVERNANCE WITH ASSET CONSTRAINTS ACROSS DATA STORAGE LOCATIONS

(71) Applicant: International Business Machines Corporation, Armonk, NY (US)

(72) Inventors: Ramasuri Narayanam, Andhra Pradesh (IN); Rishi Saket, Bangalore (IN); Ety Khaitzin, Petah Tikva (IL); Ritwik Chaudhuri, Bangalore (IN); Rohith Dwarakanath Vallam, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 17/387,404

(22) Filed: Jul. 28, 2021

(65) Prior Publication Data
US 2023/0030333 A1 Feb. 2, 2023

(51) Int. Cl.
*G06F 3/06* (2006.01)
(52) U.S. Cl.
CPC .......... *G06F 3/0655* (2013.01); *G06F 3/0604* (2013.01); *G06F 3/067* (2013.01); *G06F 3/0614* (2013.01)
(58) Field of Classification Search
CPC ....... G06F 3/0604; G06F 3/0614; G06F 3/067
See application file for complete search history.

(56) References Cited

U.S. PATENT DOCUMENTS

| | | | |
|---|---|---|---|
| 5,231,566 | A | 7/1993 | Blutinger et al. |
| 5,319,542 | A | 6/1994 | King, Jr. et al. |
| 5,740,425 | A | 4/1998 | Povilus |
| 9,330,109 | B2 | 5/2016 | Bone et al. |

(Continued)

OTHER PUBLICATIONS

Open Policy Agent, Philosophy, Aug. 6, 2020 [retrieved from internet Jan. 23, 2023][<URL:https://web.archive.org/web/20200806005655/https://www.openpolicyagent.org/docs/latest/philosophy/>] (Year: 2020).*

(Continued)

*Primary Examiner* — David Yi
*Assistant Examiner* — Nicholas A. Paperno
(74) *Attorney, Agent, or Firm* — Ference & Associates LLC

(57) ABSTRACT

One embodiment provides a method, including: receiving, at a central system, a query requesting access to a dataset, wherein the central system communicates with a plurality of data storage locations, each having a governance policy for data stored at the data storage location, wherein different portions of the dataset are stored within different of the plurality of data storage locations; sending a sub-query formulated based upon the query; receiving a governance enforcement actions listing corresponding to the portion of the dataset stored within the corresponding data storage location; generating a meta-policy of enforcement actions for all of the plurality of data storage locations storing portions of the dataset, wherein the meta-policy identifies enforcement actions and an order of the enforcement actions to be applied to the dataset; and providing the meta-policy to each of the plurality of data storage locations.

20 Claims, 5 Drawing Sheets

(56) References Cited

U.S. PATENT DOCUMENTS

| | | |
|---|---|---|
| 2012/0317085 A1 | 12/2012 | Green et al. |
| 2015/0156065 A1 | 6/2015 | Grandhe et al. |
| 2015/0220659 A1* | 8/2015 | Rissanen ............. G06F 21/6218 707/759 |
| 2018/0288051 A1* | 10/2018 | Hockings .............. G06F 21/556 |
| 2018/0367506 A1 | 12/2018 | Ford et al. |
| 2019/0205550 A1* | 7/2019 | Gordon ............... G06F 21/6218 |
| 2019/0312909 A1 | 10/2019 | Kulkarni et al. |
| 2020/0356536 A1 | 11/2020 | Nilsson |
| 2021/0026982 A1* | 1/2021 | Amarendran ......... G06F 16/113 |
| 2021/0209077 A1* | 7/2021 | Snellman ............. G06F 16/219 |

OTHER PUBLICATIONS

Open Policy Agent, Introduction, Aug. 6, 2020 [retrieved from internet Jan. 23, 2023][<URL:https://web.archive.org/web/20200806010300/https://www.openpolicyagent.org/docs/latest/>](Year: 2020).*

* cited by examiner

CONSISTENT GOVERNANCE WITH ASSET CONSTRAINTS ACROSS DATA STORAGE LOCATIONS

BACKGROUND

The movement of data from local storage to remote storage is becoming more common. Additionally, instead of fully moving the data to remote storage, an entity may simply make the data accessible via a remote storage entity. This is particularly true if the data owner wants the data to be accessible by many different entities and from many different locations. By placing or storing the data with or facilitating access to the data via a storage provider (e.g., cloud service provider, remote service provider, on-premises service provider, etc.), the data owner is able to allow access to the data to any entities that are authorized to access the data from any location. Additionally, by moving the data to or providing access to the data through a service provider, the data owner is also moving some management duties and resource requirements to the service provider. For example, the data owner no longer has to manage the data by responding to query responses by entities accessing the data. Rather, the service provider is responsible for providing responses to any queries.

BRIEF SUMMARY

In summary, one aspect of the invention provides a method, including: receiving, at a central system from a user, a query requesting access to a dataset, wherein the central system communicates with a plurality of data storage locations, each having a governance policy for data stored at the data storage location, wherein different portions of the dataset are stored within different of the plurality of data storage locations; sending, from the central system to each of the plurality of data storage locations storing portions of the dataset, a sub-query formulated based upon the query; receiving, at the central system from each of the plurality of data storage locations storing portions of the dataset, a governance enforcement actions listing corresponding to the portion of the dataset stored within the corresponding data storage location; generating, at the central system and based upon the governance enforcement actions listings received from each of the plurality of data storage locations storing portions of the dataset, a meta-policy of enforcement actions for all of the plurality of data storage locations storing portions of the dataset, wherein the meta-policy identifies enforcement actions and an order of the enforcement actions to be applied to the dataset; and providing the meta-policy to each of the plurality of data storage locations storing portions of the dataset.

Another aspect of the invention provides an apparatus, including: at least one processor; and a computer readable storage medium having computer readable program code embodied therewith and executable by the at least one processor; wherein the computer readable program code is configured to receive, at a central system from a user, a query requesting access to a dataset, wherein the central system communicates with a plurality of data storage locations, each having a governance policy for data stored at the data storage location, wherein different portions of the dataset are stored within different of the plurality of data storage locations; wherein the computer readable program code is configured to send, from the central system to each of the plurality of data storage locations storing portions of the dataset, a sub-query formulated based upon the query; wherein the computer readable program code is configured to receive, at the central system from each of the plurality of data storage locations storing portions of the dataset, a governance enforcement actions listing corresponding to the portion of the dataset stored within the corresponding data storage location; wherein the computer readable program code is configured to generate, at the central system and based upon the governance enforcement actions listings received from each of the plurality of data storage locations storing portions of the dataset, a meta-policy of enforcement actions for all of the plurality of data storage locations storing portions of the dataset, wherein the meta-policy identifies enforcement actions and an order of the enforcement actions to be applied to the dataset; and wherein the computer readable program code is configured to provide the meta-policy to each of the plurality of data storage locations storing portions of the dataset.

An additional aspect of the invention provides a computer program product, including: a computer readable storage medium having computer readable program code embodied therewith, the computer readable program code executable by a processor; wherein the computer readable program code is configured to receive, at a central system from a user, a query requesting access to a dataset, wherein the central system communicates with a plurality of data storage locations, each having a governance policy for data stored at the data storage location, wherein different portions of the dataset are stored within different of the plurality of data storage locations; wherein the computer readable program code is configured to send, from the central system to each of the plurality of data storage locations storing portions of the dataset, a sub-query formulated based upon the query; wherein the computer readable program code is configured to receive, at the central system from each of the plurality of data storage locations storing portions of the dataset, a governance enforcement actions listing corresponding to the portion of the dataset stored within the corresponding data storage location; wherein the computer readable program code is configured to generate, at the central system and based upon the governance enforcement actions listings received from each of the plurality of data storage locations storing portions of the dataset, a meta-policy of enforcement actions for all of the plurality of data storage locations storing portions of the dataset, wherein the meta-policy identifies enforcement actions and an order of the enforcement actions to be applied to the dataset; and wherein the computer readable program code is configured to provide the meta-policy to each of the plurality of data storage locations storing portions of the dataset.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
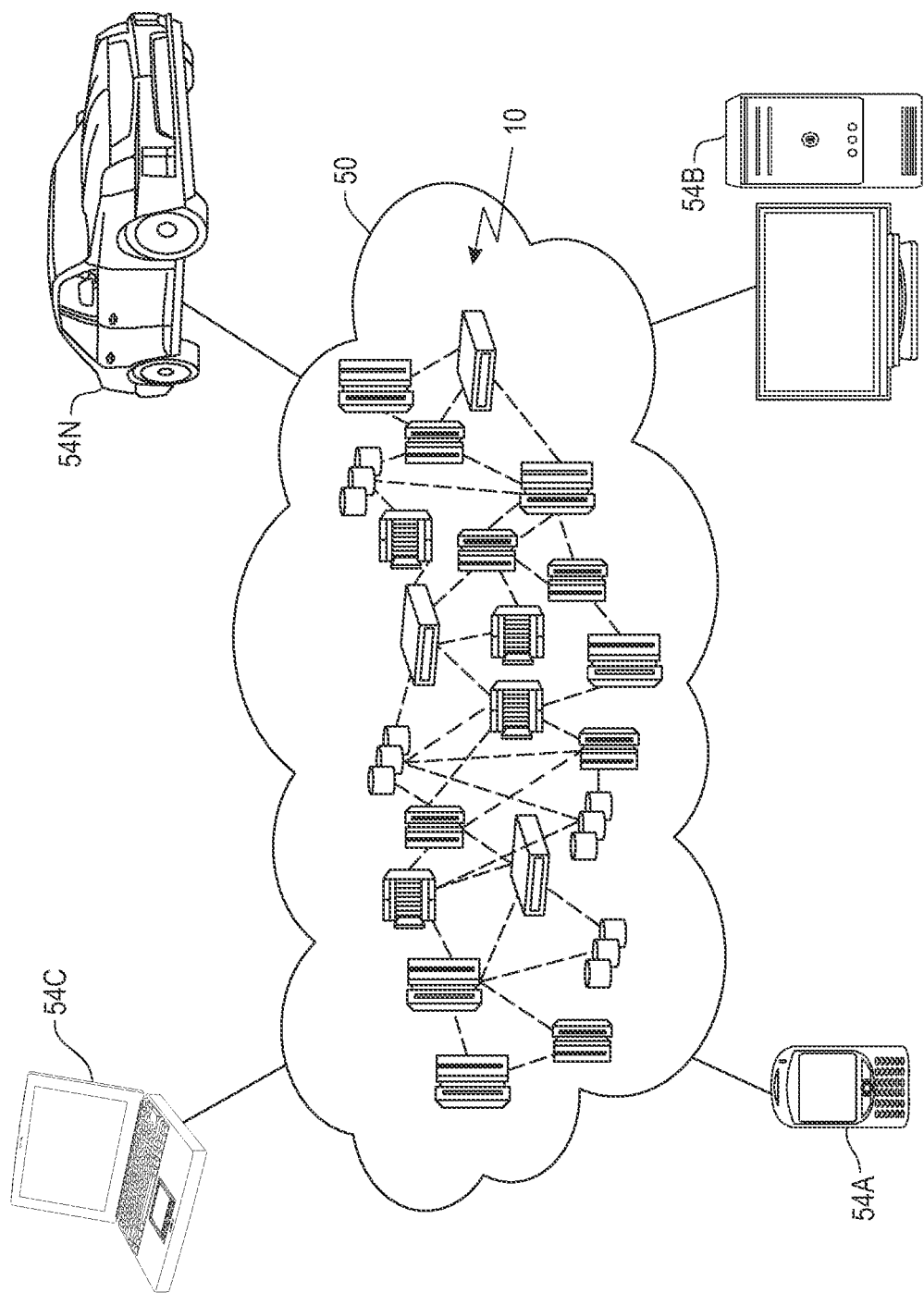
FIG. 1 depicts a cloud computing environment according to an embodiment of the present invention.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resource but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
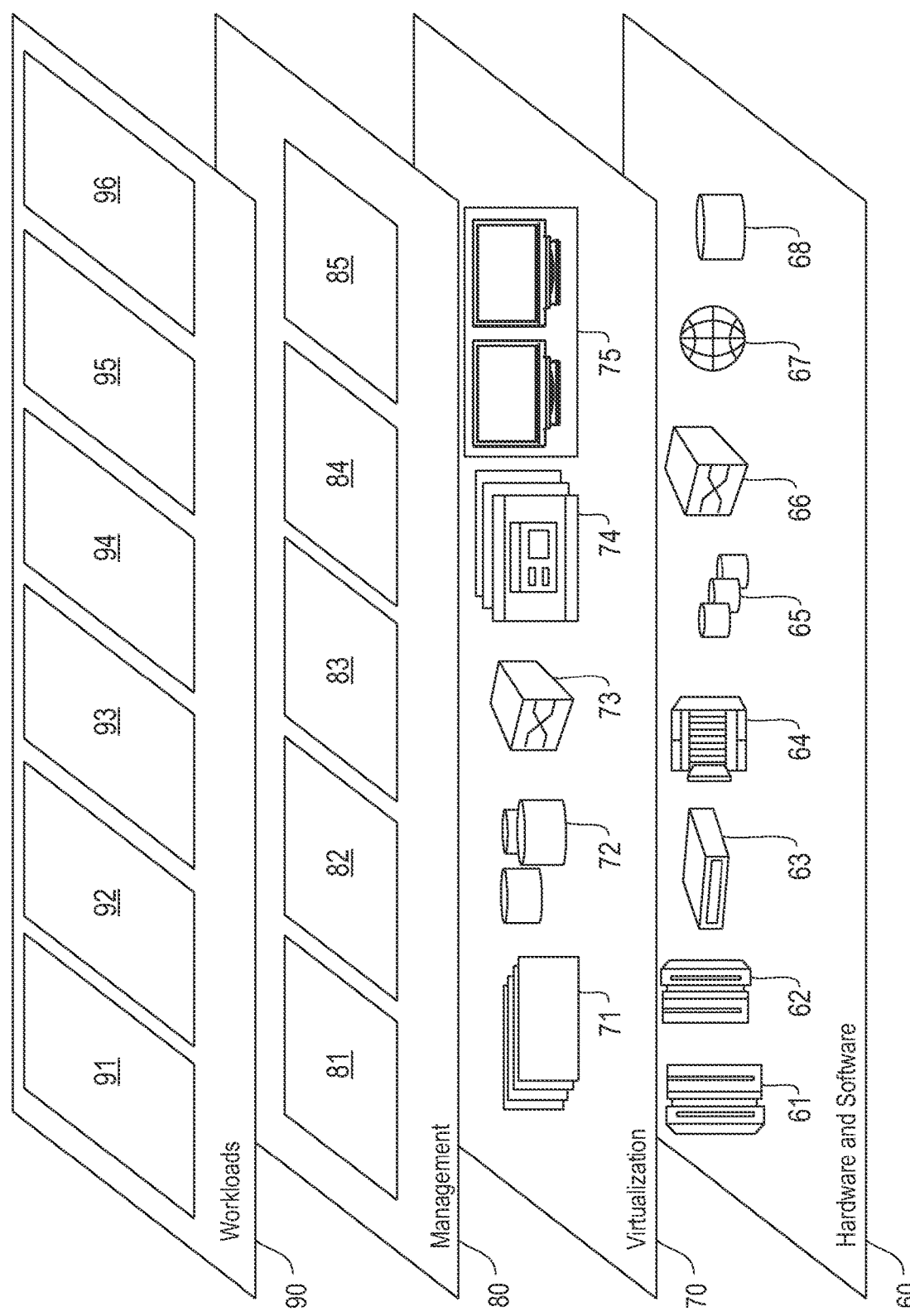
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data storage and query response 96.

When a service provider provides a response to a query, the service provider formulates a sub-query and provides the sub-query to the data storage location where the data is stored. In many cases, a dataset may be distributed across multiple data storage locations. In other words, one portion of the dataset is stored in one data storage location and another portion of the dataset is stored in another data storage location. In the case of a distributed dataset, the service provider formulates multiple sub-queries and provides an appropriate sub-query to a data storage location based upon the data that is stored within that location.

The problem with having a dataset distributed across multiple data storage locations is that each data storage location may have its own governance policy which identifies what users are allowed to access what data or portions of data that are stored in the data storage location. The governance policy also identifies what information should be treated as sensitive or personal information and identifies what enforcement actions should be taken with respect to the sensitive or personal information in the event that a requesting user is authorized to access the data. Different enforcement actions may include masking data, redacting data, marking data, replacing data, encrypting data, and the like. Since each data storage location has its own governance policy, data within the same dataset but distributed across multiple data storage locations may be treated differently, which leads to inconsistent enforcement actions across the dataset which results in requesting or querying users receiving inconsistent information. For example, if one data storage location masks sensitive data while another data storage location replaces sensitive data, the user will receive a dataset having both the masked and replaced data which results in inaccurate query responses. In conventional systems, the governance policies are stored and implemented at the data storage location, so there is no conventional technique for ensuring consistent governance policy and enforcement action application across a distributed or hybrid dataset.

Accordingly, an embodiment provides a system and method for maintaining consistent enforcement actions for a dataset stored across a plurality of data storage locations by creating and implementing a meta-policy identifying enforcement actions and an order of the enforcement actions. In other words, the system provides a technique for implementing distributed governance with asset constraints for hybrid data access. A central system that is in communication with all the data storage locations storing portions of a dataset, receives a query from a requesting or querying user, where the query is requesting access to one or more portions of the dataset. The central system formulates sub-queries, from the query, to be sent to the individual data storage locations that store portions of the requested dataset. The sub-queries are formulated based upon the information of the dataset that is stored within a corresponding data storage location.

From each of the data storage locations the central system receives a governance enforcement actions listing for the portion of the dataset stored within the data storage location. The governance enforcement actions listing identifies the enforcement actions that are applicable to the requested dataset based upon the governance policy of the corresponding data storage location. The central system aggregates and prioritizes the enforcement actions into a meta-policy. Not only does the meta-policy identify the enforcement actions that should be applied to the portions of the dataset across the data storage locations, but it also identifies the order in which enforcement actions should be applied. The central system then provides the meta-policy to the data storage locations. Provision of the meta-policy includes formatting the meta-policy in a format that is readable and executable by the data storage locations.

Such a system provides a technical improvement over current systems for storing portions of a dataset within multiple data storage locations. The described system ensures that data within a dataset is treated consistently even when portions of the dataset are stored in different data storage locations. Within the described system the service provider or central system generates a meta-policy that is based upon the governance policies of all the data storage locations that store at least a portion of the dataset being requested by a user. The central system distributes the meta-policy to each of the data storage locations allowing the data storage locations to implement consistent enforcement actions across the dataset even though the dataset is distributed across multiple data storage locations. Additionally, the central system is able to format the meta-policy so that each data storage location can receive and implement the meta-policy, thereby eliminating the need for all the data storage locations to be of the same type or have similarly formatted governance policies. Thus, the described system and method provides a technique that allows for consistent governance policy and enforcement action implementation across multiple data storage locations that is not found in conventional techniques.

Figure 3:
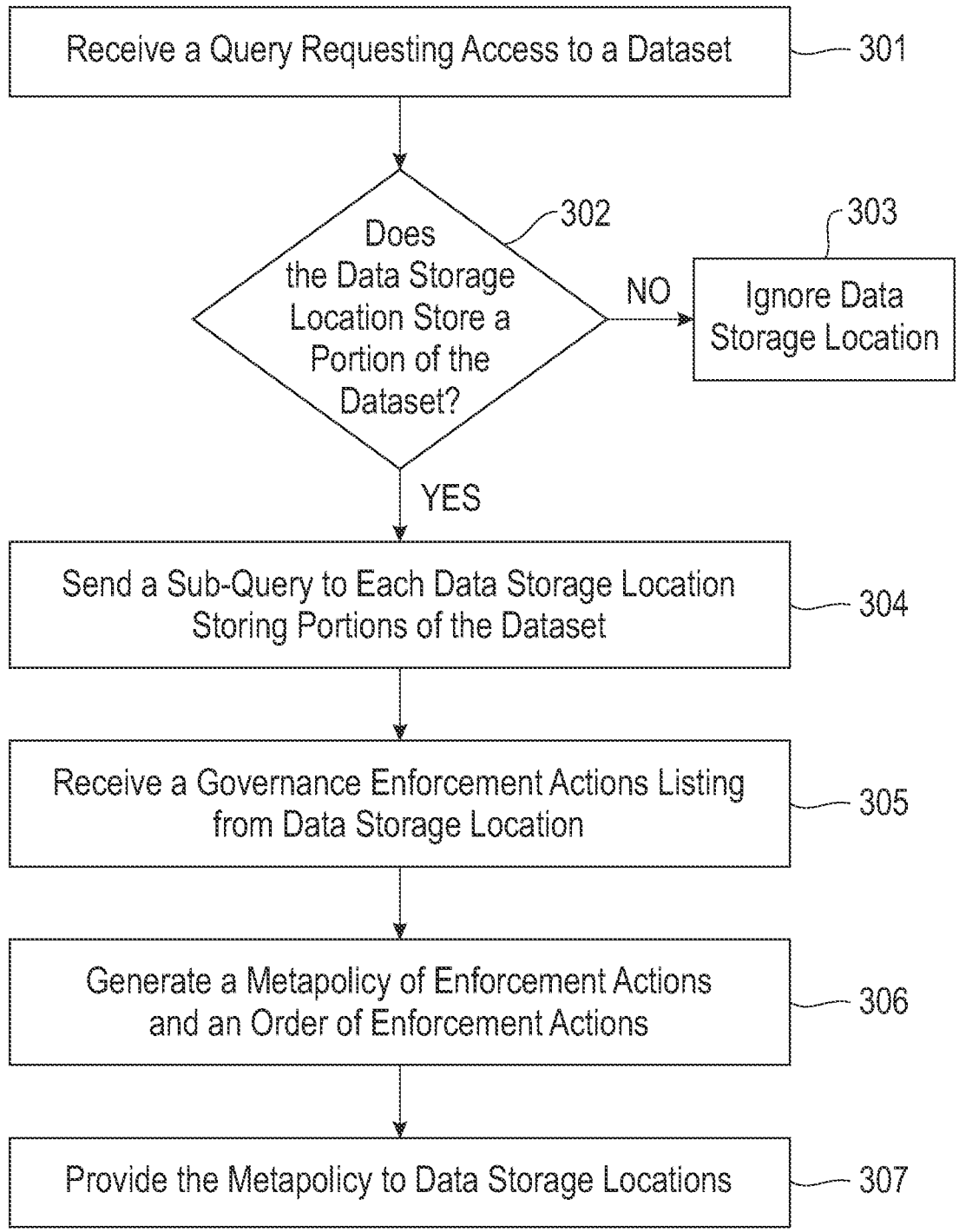
FIG. 3 illustrates a method of maintaining consistent enforcement actions for a dataset stored across a plurality of data storage locations by creating and implementing a meta-policy identifying enforcement actions and an order of the enforcement actions.

FIG. 3 illustrates a method for maintaining consistent enforcement actions for a dataset stored across a plurality of data storage locations by creating and implementing a meta-policy identifying enforcement actions and an order of the enforcement actions. At 301 the central system receives a query from a requesting or querying user requesting access to one or more portions of a dataset. The one or more portions may include subsets of the dataset or may include the entirety of the dataset. The one or more portions of the dataset that are requested by the user will be referred to as the requested dataset for ease of readability. Thus, the entire dataset may include additional information that is not included in the requested dataset. Different types of datasets may include a relational table, structured dataset, table, or the like. Thus, the requested dataset may include a column, row, particular value, sets of values, the entire dataset, or the like.

As an example, a requesting user may request a particular set of values that correspond to a column within a table dataset. Data corresponding to one portion of the column may be stored in one data storage location, whereas data corresponding to another portion of the column may be stored in a different data storage location. For ease of readability, two different data storage locations will be referred to herein. However, it should be understood that portions of the requested dataset may be stored across many more data storage locations.

The central system may be a service provider, system host, or the like, and may be implemented on different tools, for example, open-source tools (e.g., EGERIA®, Open Policy Agent (OPA), etc.), local tools or dashboards, proprietary tools or dashboards, or the like. EGERIA is a registered trademark of ODPI, Inc. in the United States and other countries. Thus, the central system may communicate with a plurality of data storage locations, each having its own governance policy applicable to data stored within the data storage location. The data storage locations may be governance policy engines that hold data catalogs and a governance engine which enforces the governance policies of the governance policy engine within the data catalog. The governance policy identifies users or types of users that are allowed to access data and what types of data they are allowed to access, the enforcement actions that should be applied to particular data, for example, sensitive or personal data, the order that enforcement actions should be applied to the data, and the like.

The governance policy also identifies what type of data or data group is considered sensitive or personal data. For example, the governance policy may identify that home addresses, names, and phone numbers are sensitive data. The governance policy may also identify that different types of data are sensitive for particular user or user types, but not considered sensitive for other users or user types. For example, if the requesting user is a management user type, the system may identify that no information is considered sensitive data, whereas if the requesting user is an engineer user type, the system may identify that some information is considered sensitive data. Different portions of the requested dataset may be stored in different data storage locations.

Thus, different portions of the requested dataset may be subject to different governance policies due to or based upon the data storage location that the requested dataset portion is stored within.

Upon receiving the query, the central system determines which data storage locations the requested dataset is located within. The information identifying which data storage locations are storing one or more portions of the requested dataset is stored within the central system. Thus, the central system identifies if a data storage location stores a portion of the requested dataset at 302. If the data storage location does not store one or more portions of the requested dataset, the central system ignores that data storage location at 303. If, on the other hand, the data storage location does store one or more portions of the requested dataset, the central system sends a sub-query to the data storage location at 304. For ease of readability, the data storage locations storing portions of the requested dataset will be discussed herein. However, it should be understood that the central system may communicate with data storage locations in addition to the data storage locations that store portions of the requested dataset. However, the governance policies and enforcement actions of those data storage locations that do not store any portions of the requested dataset are not applicable with respect to the requested dataset and, therefore, are ignored by the central system with respect to the requested dataset.

At 304, the central system formulates a sub-query for each data storage location storing portions of the requested dataset. The sub-query is formulated based upon the portion of the requested dataset that is stored at the data storage location the sub-query is being sent to. In other words, the central system knows what data storage locations are storing what portions of the requested dataset. Accordingly, the central system formulates a sub-query, from the received query, that requests the specific portion of the requested dataset that is stored in the data storage location receiving the sub-query. Additionally, the sub-query may be formulated based upon the characteristics of the data storage location where the sub-query is being sent. For example, each data storage location may have its own query formats, query requirements, or the like. The central system knows the characteristics of the data storage location and will, therefore, formulate the sub-query based upon the characteristics and to fulfill the requirements of the data storage location. The sub-query requests the governance actions that are applicable to the data storage location.

Accordingly, in response to the sub-queries, the central system receives, at 305, a governance enforcement actions listing corresponding to the portion of the requested dataset that is stored in the data storage location corresponding to the governance enforcement actions listing. In other words, each data storage location sends a listing identifying the enforcement actions that are to be applied to the requested dataset portion stored at the data storage location. This enforcement actions listing is a listing of data-storage-location-specific enforcement actions. The enforcement actions listing is derived from the governance policy of the data storage location. Thus, the central system will receive multiple governance enforcement actions listings and each listing may have different enforcement actions and may have a different order of the enforcement actions as compared to others of the governance enforcement actions listings. Additionally, each of the governance enforcement actions listings will be formatted based upon the data storage location corresponding to and providing the listing.

To generate the governance enforcement actions listing, a data storage location will execute a local process of the data storage location. The local process is based upon the portion of the requested dataset that is being requested. In other words, a single data storage location may have different governance policies based upon the dataset or portion of the dataset. For example, one dataset stored within a data storage location may have no restrictions, whereas another dataset has many different restrictions. Thus, the local process and, therefore, the governance enforcement actions listing will be based upon both the data storage location and the requested dataset.

Upon executing the local process, the data storage location extracts the portion of the requested dataset residing at the data storage location as identified in the sub-query and identifies the governance policies that need to be enforced for that portion of the requested dataset. The governance policies are identified within part of the policy manager of the data storage location. Once the applicable governance policy(s) are identified and executed, the data storage location creates a list of enforcement actions corresponding to the governance policy applicable to the portion of the requested dataset. This listing is the governance enforcement actions listing for that data storage location that is provided to the central system.

From the governance enforcement actions listings that the central system receives from the data storage locations having portions of the dataset, the central system generates a meta-policy of enforcement actions for all of the plurality of data storage locations storing portions of the dataset at 306. The meta-policy is the policy of enforcement actions and an order of the enforcement actions to be applied by all the data storage locations storing portions of the dataset. The meta-policy not only identifies what enforcement actions should be applied by the data storage locations, but also identifies the priority or order that the enforcement actions should be applied.

Since the meta-policy is generated based upon the governance policies of the data storage locations, the meta-policy is based upon characteristics of the requesting user (e.g., the type of data the user or user type is authorized to access, the type of data that has to be modified before being accessed by the user, the type of data considered sensitive based upon the user or user type, etc.) and characteristics of the data being accessed (e.g., the type of personal or sensitive data, a volume of data in the request, etc.). Thus, the meta-policy synchronizes all of the data storage location specific enforcement actions to derive a consistent list of enforcements actions with arguments and the order of enforcement actions. By generating this meta-policy for all the data storage locations, the system ensures that consistent enforcement actions, including an order of the enforcement actions, is applied to all portions of the dataset, thereby providing consistent information back to the requesting or querying user.

To generate the meta-policy, the central system aggregates the enforcement actions that are included in all of the governance enforcement actions listings into a single listing. For example, if one governance enforcement actions listing includes masking the sensitive data and another governance enforcement actions listing from a different data storage location includes replacing the sensitive data, the meta-policy will include both masking and replacing the sensitive data. If the aggregated listing of enforcement actions includes a "deny" or other similar action, meaning that at least one of the governance enforcement actions listing included such an enforcement action, then the meta-policy will indicate that the user should be denied access to the information corresponding to the "deny" enforcement action on all data storage locations storing portions of the dataset. This means that the user will not gain access to this information within any of the data storage locations. The deny enforcement action may occur when any of the data storage locations identify that the user or user type requesting the information is not authorized to access the information.

If the aggregated listing of enforcement actions includes a "remove_data", or similar, enforcement action, the meta-policy will include an enforcement action that the data should be removed from the response to the query, but the user can access other data within the dataset. In other words, the at least one of the governance enforcement actions listings identified that the requesting user is not authorized to access a subset of the dataset. Thus, this subset of the dataset should be removed before a response is provided to the user. The "remove_data" enforcement action may be specific in the type or location of data that should be removed. For example, this enforcement action may identify a particular column, a particular row, a particular type of sensitive data, or the like, that should be removed. The "deny" enforcement action has the greatest priority and, if present in the aggregated listing, will be the prevailing enforcement action. The "remove_data" enforcement action has the next greatest priority and, if present in an aggregated listing that does not include a "deny" enforcement action, will be the prevailing enforcement action.

Any data not subject to a "deny" or "remove_data" enforcement action will be subject to other enforcement actions included in the aggregated listing. The other enforcement actions include all enforcement actions from the data storage locations. Using the example mentioned above regarding masking and replacing sensitive data coming from different governance enforcement actions listings, the data not subject to either a "deny" or "remove_data" enforcement action will be subject to both a masking and replacing enforcement action. Accordingly, the central system determines the priority or order that these remaining enforcement actions should be applied. The priority or order of the enforcement actions is set by the central system and may be set by a programming or managing user, a default priority, set based upon the requesting user or user type (meaning different users may have different orders for the enforcement actions), set based upon the type of sensitive data (meaning different types of sensitive data may have different orders for the enforcement actions), or the like. Based upon the prioritization or order set by the central system, the enforcement actions within the meta-policy are ordered per the prioritization to make an ordered grouping of enforcement actions.

Once the meta-policy is generated, the central system provides or passes the meta-policy to each of the data storage locations storing portions of the requested dataset at 307. However, providing the meta-policy to the data storage locations is not as simple as just passing or sending the meta-policy to each data storage location. Rather, each data storage location has particular programming or a particular language. In other words, the central system must communicate the meta-policy to each of the data storage locations in a manner which the data storage location can understand and execute. Thus, the central system must convert the meta-policy into a format readable or digestible by each of the data storage locations storing portions of the dataset. In other words, the central system may convert the meta-policy into multiple formats due to the differences between data storage locations.

One technique for making this conversion is to use a policy engine that unifies policy enforcement into a format that is digestible by each of the data storage locations. The policy engine may be an open-source policy engine, for example, Open Policy Agent, that enables the design of the meta-policy and decouples policy decision-making from policy enforcement. Other policy engines may be used, for example, proprietary policy engines, other open-source policy engines, or the like. Additionally, tools other than a policy engine may be utilized.

In response to receiving the meta-policy, each data storage location may execute the enforcement actions in the order identified within the meta-policy on the portion of the requested dataset stored within the data storage location. The data storage location then provides the response to the query generated in view of the meta-policy back to the central system. The central system aggregates the responses received from all of the data storage locations storing portions of the dataset and provides this aggregated response back to the requesting or querying user in response to the provided query. Thus, the response provided to the user is an aggregation of all the responses by the data storage locations storing portions of the requested dataset generated in view of the meta-policy, thereby ensuring consistent responses and treatment of similar data across all the data storage locations storing portions of the requested dataset.

Figure 4:
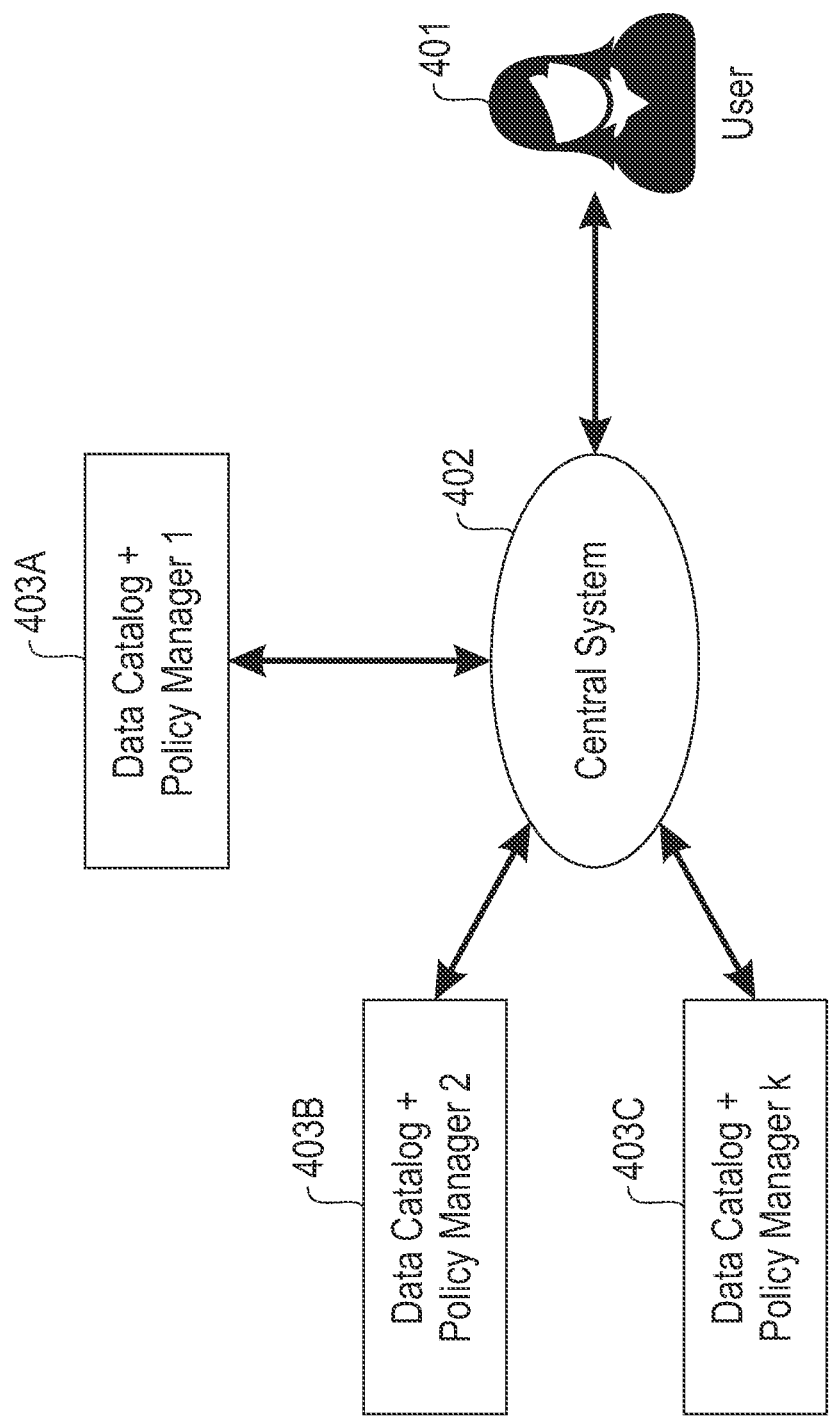
FIG. 4 illustrates an example overall system architecture for maintaining consistent enforcement actions for a dataset stored across a plurality of data storage locations by creating and implementing a meta-policy identifying enforcement actions and an order of the enforcement actions.

FIG. 4 illustrates a system architecture for maintaining consistent enforcement actions for a dataset stored across a plurality of data storage locations by creating and implementing a meta-policy identifying enforcement actions and an order of the enforcement actions. A user 401 provides a query to the central system 402 requesting access to a dataset, where different portions of the dataset are stored on different of a plurality of data storage locations 403A, 403B, and 403C. It should be understood that three data storage locations are merely illustrative, as more or fewer may have portions of the requested dataset. In the illustrated example, each data storage location 403A-403C includes a data catalog and policy manager. The data catalog is where the data is stored and the policy manager has the governance policies for datasets and portions of datasets stored within the data catalog. The central system 402 is in communication with the data storage locations 403A-403C.

Upon receiving the query, the central system 402 formulates sub-queries from the query to be sent to each of the data storage locations 403A-403C. Each of the data storage locations 403A-403C executes the sub-query to evaluate the data storage location specific governance policies that are applicable to the requested dataset portion that is stored within the data storage location. From the governance policy of the data storage location, the data storage location provides a listing of data storage location specific enforcement actions, referred to a governance enforcement actions listing elsewhere herein, to the central system 402. Thus, the central system 402 receives a plurality of data storage location specific enforcement action listings, one from each data storage location 403A-403C.

From these listings, the central system 402 creates a meta-policy the synchronizes all of the data storage location specific enforcement actions into a single grouping and also assigns an order to the enforcement actions within the grouping. The meta-policy is then provided from the central system 402 to each of the data storage locations 403A-403C. Each data storage location 403A-403C executes the query in view of the meta-policy on the portion of the dataset stored within the data storage location and provides the response back to the central system 402. The central system 402 aggregates the responses and provides a response to the query back to the user 401.

Figure 5:
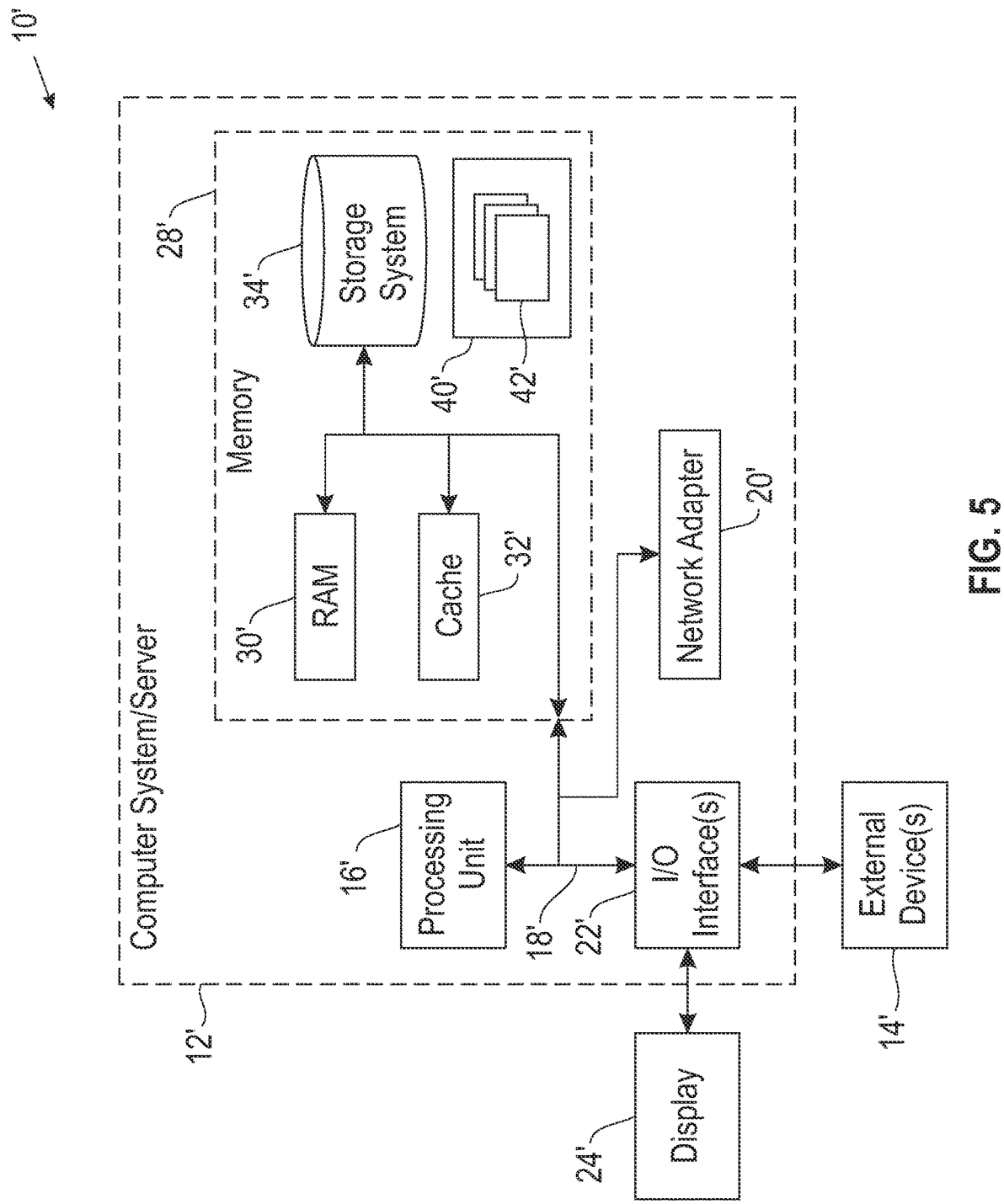
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
receiving, at a central system from a user, a query requesting access to a dataset, wherein the central system communicates with a plurality of data storage locations, each having a governance policy for data stored at the data storage location, wherein different portions of the dataset are stored within different of the plurality of data storage locations;
sending, from the central system to each of the plurality of data storage locations storing portions of the dataset, a sub-query formulated based upon the query;
receiving, at the central system, a plurality of governance enforcement action listings, wherein each of the plurality of governance enforcement action listings is received from one of the plurality of data storage locations storing portions of the dataset and identifies data-storage-location-specific enforcement actions to be applied to the portion of the dataset stored within the one of the plurality of data storage locations;
generating, at the central system and from the plurality of governance enforcement actions listings, a meta-policy of enforcement actions for all of the plurality of data storage locations storing portions of the dataset, wherein the meta-policy identifies enforcement actions and an order of the enforcement actions to be applied to the dataset, wherein the generating comprises aggregating the data-storage-location-specific enforcement actions from the plurality of governance enforcement action listings and ordering the data-storage-location-specific enforcement actions based upon a priority of an enforcement action type, wherein a deny enforcement action type has a highest priority and a remove enforcement action type has a next highest priority and remaining enforcement action types are prioritized based upon a type of data within the dataset; and
providing the meta-policy to each of the plurality of data storage locations storing portions of the dataset.

2. The method of claim 1, wherein the sending comprises formulating the sub-query based upon the portion of the dataset stored within the data storage location receiving the sub-query.

3. The method of claim 1, wherein each of the governance enforcement actions listings are generated by one of the plurality of data storage locations responsive to the one of the plurality of data storage locations executing a local process, extracting the portion of the dataset stored within the one of the plurality of data storage locations, and identifying a governance policy corresponding to the portion of the dataset, wherein the governance policy identifies enforcement actions.

4. The method of claim 1, comprising receiving, at the central system and from each of the plurality of data storage locations, a response to the query in view of the meta-policy.

5. The method of claim 4, wherein the response received from each of the plurality of data storage locations storing portions of the dataset is generated by a data storage location of the plurality of data storage locations executing the enforcement actions within the order identified within the meta-policy on the portion of the dataset.

6. The method of claim 4, comprising providing, from the central system and to the user, a response to the query, wherein the response comprises an aggregation of the responses received from the data storage locations and fulfilling the meta-policy.

7. The method of claim 1, wherein at least one of the governance enforcement actions listing identifies the user is not authorized to access the portion of the dataset and wherein the enforcement actions of the meta-policy comprises denying access to the dataset across the plurality of data storage locations storing portions of the dataset.

8. The method of claim 1, wherein at least one of the governance enforcement actions listing identifies the user is not authorized to access a subset of the dataset and wherein the enforcement actions of the meta-policy comprises removing the subset of the dataset across the plurality of data storage locations storing portions of the dataset.

9. The method of claim 1, wherein the order of the enforcement actions is based upon a priority of enforcement actions identified within the central system.

10. The method of claim 1, wherein the providing comprises converting the meta-policy to a format readable by each of the plurality of data storage locations storing portions of the dataset.

11. An apparatus, comprising:
at least one processor; and
a computer readable storage medium having computer readable program code embodied therewith and executable by the at least one processor;
wherein the computer readable program code is configured to receive, at a central system from a user, a query requesting access to a dataset, wherein the central system communicates with a plurality of data storage locations, each having a governance policy for data stored at the data storage location, wherein different portions of the dataset are stored within different of the plurality of data storage locations;
wherein the computer readable program code is configured to send, from the central system to each of the plurality of data storage locations storing portions of the dataset, a sub-query formulated based upon the query;
wherein the computer readable program code is configured to receive, at the central system, a plurality of governance enforcement action listings, wherein each of the plurality of governance enforcement action listings is received from one of the plurality of data storage locations storing portions of the dataset and identifies data-storage-location-specific enforcement actions to be applied to the portion of the dataset stored within the one of the plurality of data storage locations;
wherein the computer readable program code is configured to generate, at the central system and from the plurality of governance enforcement actions listings, a meta-policy of enforcement actions for all of the plurality of data storage locations storing portions of the dataset, wherein the meta-policy identifies enforcement actions and an order of the enforcement actions to be applied to the dataset, wherein the generating comprises aggregating the data-storage-location-specific enforcement actions from the plurality of governance enforcement action listings and ordering the data-storage-location-specific enforcement actions based upon a priority of an enforcement action type, wherein a deny enforcement action type has a highest priority and a remove enforcement action type has a next highest priority and remaining enforcement action types are prioritized based upon a type of data within the dataset; and
wherein the computer readable program code is configured to provide the meta-policy to each of the plurality of data storage locations storing portions of the dataset.

12. A computer program product, comprising:
a computer readable storage medium having computer readable program code embodied therewith, the computer readable program code executable by a processor;
wherein the computer readable program code is configured to receive, at a central system from a user, a query requesting access to a dataset, wherein the central system communicates with a plurality of data storage locations, each having a governance policy for data stored at the data storage location, wherein different portions of the dataset are stored within different of the plurality of data storage locations;
wherein the computer readable program code is configured to send, from the central system to each of the plurality of data storage locations storing portions of the dataset, a sub-query formulated based upon the query;
wherein the computer readable program code is configured to receive, at the central system, a plurality of governance enforcement action listings, wherein each of the plurality of governance enforcement action listings is received from one of the plurality of data storage locations storing portions of the dataset and identifies data-storage-location-specific enforcement actions to be applied to the portion of the dataset stored within the one of the plurality of data storage locations;
wherein the computer readable program code is configured to generate, at the central system and from the plurality of governance enforcement actions listings, a meta-policy of enforcement actions for all of the plurality of data storage locations storing portions of the dataset, wherein the meta-policy identifies enforcement actions and an order of the enforcement actions to be applied to the dataset, wherein the generating comprises aggregating the data-storage-location-specific enforcement actions from the plurality of governance enforcement action listings and ordering the data-storage-location-specific enforcement actions based upon a priority of an enforcement action type, wherein a deny enforcement action type has a highest priority and a remove enforcement action type has a next highest priority and remaining enforcement action types are prioritized based upon a type of data within the dataset; and
wherein the computer readable program code is configured to provide the meta-policy to each of the plurality of data storage locations storing portions of the dataset.

13. The computer program product of claim 12, wherein the sending comprises formulating the sub-query based upon the portion of the dataset stored within the data storage location receiving the sub-query.

14. The computer program product of claim 12, wherein each of the governance enforcement actions listings are generated by one of the plurality of data storage locations responsive to the one of the plurality of data storage locations executing a local process, extracting the portion of the dataset stored within the one of the plurality of data storage locations, and identifying a governance policy corresponding to the portion of the dataset, wherein the governance policy identifies enforcement actions.

15. The computer program product of claim 12, comprising receiving, at the central system and from each of the plurality of data storage locations, a response to the query in view of the meta-policy.

16. The computer program product of claim 15, wherein the response received from each of the plurality of data storage locations storing portions of the dataset is generated by a corresponding of the data storage locations executing the enforcement actions within the order identified within the meta-policy on the portion of the dataset.

17. The computer program product of claim 15, comprising providing, from the central system and to the user, a response to the query, wherein the response comprises an aggregation of the responses received from the data storage locations and fulfilling the meta-policy.

18. The computer program product of claim 12, wherein at least one of the governance enforcement actions listing identifies the user is not authorized to access the portion of the dataset and wherein the enforcement actions of the meta-policy comprises denying access to the dataset across the plurality of data storage locations storing portions of the dataset.

19. The computer program product of claim 12, wherein at least one of the governance enforcement actions listing identifies the user is not authorized to access a subset of the dataset and wherein the enforcement actions of the meta-policy comprises removing the subset of the dataset across the plurality of data storage locations storing portions of the dataset.

20. The computer program product of claim 12, wherein the providing comprises converting the meta-policy to a format readable by each of the plurality of data storage locations storing portions of the dataset.

\* \* \* \* \*